3,028,429
METHOD OF PRODUCING 2-AMINO-1-PHENYL-1-PROPANOL HYDROCHLORIDE
Godfrey Wilbert, Carmel, N.Y., and Paul Sosis, East Paterson, N.J., assignors to Nepera Chemical Co., Inc., Harriman, N.Y., a corporation of New York
No Drawing. Filed Sept. 24, 1959, Ser. No. 841,940
4 Claims. (Cl. 260—570.6)

This invenion relates to the production of 2-amino-1-phenyl-1-propanol hydrochloride:

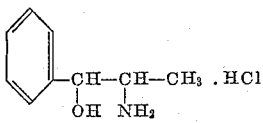

and in particular to an improvement in the method of preparing this compound by the hydrogenation of isonitrosopropiophenone by the reaction:

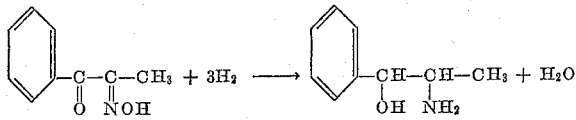

2-amino-1-phenyl-1-propanol, also known as phenylpropanolamine, is a well-known therapeutic agent widely used in the form of its hydrochloride salt in pharmaceutical preparations as a bronchial dilator and nasal vasoconstrictor.

The production of phenylpropanolamine by the hydrogenation of isonitrosopropiophenone over a palladium catalyst is a well-known reaction which is described by Hartung et al., J. Am. Chem Soc. 74, 5927–5929 (1952). Complete hydrogenation of isonitrosopropiophenone to form the amino alcohol phenylpropanolamine requires 3 mols of hydrogen per mol of isonitrosopropiophenone reacted. Undesired by-products such as the oximino alcohol formed with 1 mol of hydrogen and the amino ketone formed with 2 mols of hydrogen are frequently found in the reaction mixture after hydrogenation in accordance with the methods of the prior art if the catalyst is used for more than a single pass. For example, Hartung et al. report the reduction of isonitrosopropiophenone over a catalyst made up of 100 parts of palladium and 1.45 parts platinum as yielding 74 percent of the desired phenylpropanolamine on the first pass, but only 50 percent on the second pass due to contamination of the product with undesired oximino alcohol. Due to the extremely high cost of the catalyst employed, it is apparent that practical commercial production of phenylpropanolamine by this reaction may be realized only where the catalyst may be used in many passes without any significant reduction in product yield.

In the hydrogenation method of the prior art as described by Hartung et al., the reaction is carried out in a solution of isonitrosopropiophenone in ethanol in the presence of hydrogen chloride. At the end of the reaction the catalyst is removed by filtration, the filtrate is neutralized with a caustic solution to pH 5, concentrated by distillation and extracted repeatedly with ether. After removal of the ether extracts which contain by-products, the remaining solution is made alkaline with caustic, and extracted again repeatedly with ether. The desired phenylpropanolamine hydrochloride may be recovered from the final ether extracts by evaporation of the ether. It is apparent that this technique of recovering the desired finished product, while feasible on a laboratory scale, is not suited for economic operation on a commercial scale. This is due not only to the fact that large volumes of ether are required which adds to the cost and presents serious hazards due to the flammable and explosive nature of ether, but also due to the number of manipulative steps required in the successive neutralizations and extractions.

It is an object of the present invention to provide a commercially feasible method of preparing phenylpropanolamine hydrochloride from isonitrosopropiophenone.

It is another object of this invention to provide a method of hydrogenating isonitrosopropiophenone to yield phenylpropanolamine hydrochloride where the catalyst may be used satisfactorily through many passes without a significant reduction in product yield.

Yet another object of the present invention is to provide an efficient and economic method of recovering phenylpropanolamine hydrochloride from a reaction mixture resulting from the hydrogenation of isonitrosopropiophenone.

Other objects and the advantages of this invention will become apparent from the following detailed description.

It has now been found that isonitrosopropiophenone may be hydrogenated to yield phenylpropanolamine at good yields with reuse of the catalyst through many passes where the catalyst employed for the hydrogenation reaction is a mixture of about 30 to about 70 percent by weight of platinum and about 70 to about 30 percent by weight of palladium. It has also been found that the desired phenylpropanolamine hydrochloride may be recovered from the catalyst-free reaction mixture at the conclusion of the reaction by the steps of concentrating the reaction mixture, adding an aliphatic alcohol containing 3 to 4 carbon atoms, distilling the mixture to remove the solvent used in the hydrogenation reaction, and finally cooling the solution to induce crystallization of the desired phenylpropanolamine hydrochloride. It has also been found that by utilizing the catalyst of this invention in conjunction with the new and novel method of recovering the product that a yield of finished product in excess of 75 percent is obtained over as many as 16 passes with the same catalyst, with the product conforming to all present consumer specifications.

The isonitrosopropiophenone starting material may be prepared, for example, by the reaction of propiophenone with an alkyl nitrite as described by Slater, J. Chem. Soc. (London) 117, 587–591 (1920), by Hartung et al., J. Am. Chem. Soc. 51, 2262–2266 (1929), and in Organic Syntheses, vol. 2, pages 363–364. The general reaction conditions for the hydrogenation of isonitrosopropiophenone are entirely conventional and form no part of the present invention. The reaction is normally carried out in a solution of isonitrosopropiophenone in a one or two carbon atom aliphatic alcohol, that is methanol or ethanol, in the proportions of about 500 to about 1500 ml. solvent per mol of isonitrosopropiophenone. The solvent contains dissolved hydrogen chloride, normally in the range of 1.5 to about 3 mols of hydrogen chloride per mol of isonitrosopropiophenone. The reaction is carried out under pressure in a suitable pressure vessel with an initial hydrogen pressure up to about 70 pounds per square inch being normally used. Completion of the reaction is indicated by the cessation of hydrogen absorption into the reaction mixture, which normally occurs in about 1 hour.

It is an essential requirement in the hydrogenation of isonitrosopropiophenone in accordance with the present invention that the catalyst employed consist of a mixture of platinum and palladium in the relative proportions of about 30 to about 70 percent by weight of platinum and about 70 to about 30 percent by weight of palladium. A catalyst comprising a mixture of about 50 percent by weight palladium and 50 percent by weight of platinum is generally preferred. The catalyst is normally supplied to the reaction with the catalytic elements, that is platinum and palladium, deposited on a suitable support such as silica gel, activated carbon and the like. The amount of the metal catalyst on the support will normally be about 5 to about 10 percent by weight. The amount of catalyst supplied to the reaction may be varied but normally is in the range of about 1 to about 3 grams of the platinum-palladium mixture per mol of isonitrosopropiophenone.

It has been found that when the platinum-palladium catalyst system described above is used in the hydrogenation of isonitrosopropiophenone in accordance with this invention, the catalyst may be reused through many passes without significant reduction in product yield. This discovery, therefore, represents a significant improvement over the methods of the prior art which indicate a reduction in product yield from 74 percent down to only 50 percent on the second pass. It is apparent, therefore, that the method of this invention affords a commercially feasible method of preparing phenylpropanolamine by the hydrogenation of isonitrosopropiophenone since repeated reuse of a catalyst permits a substantial reduction in catalyst cost. Platinum and palladium are very expensive metals and catalytic reactions in the presence of the elements can be considered feasible on a commercial scale only when the catalyst may be reused through many passes.

At the conclusion of the reaction the reaction vessel is flushed out with an inert gas such as nitrogen to remove any unreacted hydrogen, and the catalyst is removed from the suspension by filtration. The catalyst-free reaction mixture is then concentrated in volume to between about 20 percent and 40 percent of its original volume. To the concentrated solution is added an aliphatic alcohol containing 3 to 4 carbon atoms, for example n-propanol, isopropanol, n-butanol and the like. Isopropanol is generally preferred since it represents the most satisfactory solvent for recrystallization of the phenylpropanolamine finished product. The quantity of aliphatic alcohol added to the concentrated catalyst-free reaction mixture is normally about 2 to about 5 volumes of aliphatic alcohol per volume of the concentrated reaction mixture. Alternately, the concentrated catalyst-free solution, prior to the addition of the three or four carbon atom alcohol, may be cooled and a portion of the phenylpropanolamine hydrochloride removed as crystals. The mother liquor is then treated with the three or four carbon atom alcohol as described above.

The resulting solution which comprises phenylpropanolamine hydrochloride, the reaction solvent, the three or four carbon atom aliphatic alcohol added and traces of water formed during the hydrogenation reaction is concentrated to between about 40 and about 60 percent of its volume. During this concentration the reaction solvent and any traces of water are removed. The resulting solution of phenylpropanolamine hydrochloride in the three or four carbon atom aliphatic alcohol is cooled to induce crystallization and the product is recovered by filtration or centrifugation.

The product so obtained has sufficient purity for many purposes but where the highest purity is desired, it is normally recrystallized. Recrystallization may be from a solution in a three or four carbon atom aliphatic alcohol or, alternately, from a concentrated water solution. In this latter procedure, the crude phenylpropanolamine hydrochloride is dissolved in water (or the mother liquor obtained from a prior recrystallization), the pH adjusted to about 2, the mixture heated and then slowly cooled. The crystals which form constitute purified phenylpropanolamine hydrochloride; the mother liquor may be reused in subsequent recrystallizations.

The following examples are included in order further to illustrate the method of this invention:

*Example I*

To a pressure reactor is charged 5.0 parts by weight of mixed catalyst (1:1, 5% palladium on charcoal, 5% platinum on charcoal), wet with 10 parts by weight of water. The reactor is flushed out with nitrogen and a solution of 16.3 parts by weight of isonitrosopropiophenone in 80 parts by weight of methanol, containing 7.65 parts by weight hydrogen chloride, is introduced. The reactor is connected to a hydrogenation apparatus and the hydrogen gauge pressure raised to 50–55 pounds per square inch. Although the major part of the hydrogen is consumed in about 15–20 minutes, agitation is continued for 1 hour. According to the decrease in gauge pressure, the hydrogenation is about 94% complete. During the hydrogenation the gauge pressure is permitted to drop to 30 pounds and the temperature reaches a maximum of 62° C.

The pressure reactor is flushed out with nitrogen, the catalyst filtered and washed and then returned to the pressure reactor for reuse. The above reaction procedure is repeated 5 additional times and the catalyst-free filtrates from the 6 runs are combined and after this solution is then concentrated to 25 percent of its original volume, and 400 parts by weight of isopropanol are added. This solution is concentrated by evaporation to about 40% of its previous volume, cooled to 10° C. and the crystals formed are recovered.

A first crop weighing 90.4 parts by weight and having a melting point of 188.9–190.7° C. is obtained. Further cooling yields a second crop of 5.5 parts by weight, melting point 180.5–184.6° C. Yield of crude phenylpropanolamine hydrochloride is 95.9 parts by weight or 85.3% of theory.

Recrystallization of the combined first and second crops from isopropanol yields 85.4 parts by weight of a white, crystalline and odorless phenylpropanolamine hydrochloride, melting point 192–194° C., equal to a yield of 76.0% of theory.

*Example II*

The reaction procedure described in Example I is repeated using the same catalyst 9 additional times representing a total of 15 passes with the same catalyst. The catalyst-free filtrate from this last pass is processed as described in Example I to yield crude phenylpropanolamine hydrochloride, melting point 180–193° C. (the bulk of the product having a melting point of 191–193° C.). The yield of crude product is 78.5% of theory.

The foregoing examples illustrate the hydrogenation of isonitrosopropiophenone in the presence of a platinum-palladium catalyst by the method of this invention. Even after 15 passes with the same catalyst, the yield of crude product is 78.5 percent of theory.

It is understood that the foregoing detailed description is given merely by way of illustration and that many variations may be made therein without departing from the spirit of our invention.

Having described our invention, what we desire to secure by Letters Patent is:

We claim:

1. In a process for the production of phenylpropanolamine hydrochloride by catalytically hydrogenating isonitrosopropiophenone in a reaction medium which consists of an alcohol of the group consisting of methanol and ethanol, a hydrogenation catalyst and hydrogen chloride, the steps which comprise effecting the hydrogenation of said isonitrosopropiophenone in said medium in contact with a hydrogenation catalyst consisting of a mixture of about 30 to about 70 percent by weight of platinum and about 70 to about 30 percent by weight of palladium on an inert support, separating the catalyst from the reaction medium after the catalytic hydrogenation of the isonitrosopropiophenone to phenylpropanolamine has proceeded to at least 75 percent of theory, again subjecting said catalyst to continued reuse for said hydrogenation reaction in a reaction medium as defined so that said catalyst is subjected to at least 5 reaction passes, with the reaction medium being separated from said catalyst in each instance prior to the reuse of said catalyst, with the separation of said catalyst and reaction medium being effected in each instance after the conversion in each pass of said hydrogenation reaction has proceeded to at least beyond 75 percent of theory.

2. In a process for the production of phenylpropanolamine hydrochloride by catalytically hydrogenating isonitrosopropiophenone in a reaction medium which consists of an alcohol of the group consisting of methanol and ethanol, a hydrogenation catalyst and hydrogen chloride, the steps which comprise effecting the hydrogenation of said isonitrosopropiophenone in said medium in contact with a hydrogenation catalyst consisting of a mixture of about 30 to about 70 percent by weight of platinum and about 70 to about 30 percent by weight of palladium on an inert support, separating the catalyst from the reaction medium after the catalytic hydrogenation of the isonitrosopropiophenone to phenylpropanolamine has proceeded to at least 75 percent of theory, again subjecting said catalyst to continued reuse for said hydrogenation reaction in a reaction medium as defined, so that said catalyst is subjected to at least 5 reaction passes, with the reaction medium being separated from said catalyst in each instance prior to the reuse of said catalyst, with the separation of said catalyst and reaction medium being effected in each instance after the conversion in each pass of said hydrogenation reaction has proceeded to at least beyond 75 percent of theory, and then separating the phenylpropanolamine hydrochloride formed from the reaction medium by evaporating said reaction medium to between about 20 percent and about 40 percent of its original volume, adding to the concentrated solution an alkyl alcohol containing 3 to 4 carbon atoms in an amount of about 2 to about 5 volumes of said alkyl alcohol per volume of said concentrated solution, evaporating the resulting mixture to between about 40 to about 60 percent of its volume and crystallizing phenylpropanolamine hydrochloride from the final concentrate by cooling.

3. Process in accordance with claim 1 wherein said catalyst consists of about equal parts by weight of platinum and palladium.

4. Process in accordance with claim 2 wherein said catalyst consists of about equal parts by weight of platinum and palladium.

References Cited in the file of this patent
FOREIGN PATENTS 561,571    Great Britain _____ May 24, 1944

OTHER REFERENCES

Hartung et al.: Jour. Am. Chem. Soc., vol. 51, pp. 2262–65 (1929).

Hartung et al.: Jour. Am. Chem. Soc., vol. 74, pp. 5927–29 (1952).